United States Patent
Roy Thill et al.

(10) Patent No.: US 11,519,283 B2
(45) Date of Patent: Dec. 6, 2022

(54) ATTACHMENT REGION FOR CMC COMPONENTS

(71) Applicant: Raytheon Technologies Corporation, Farmington, CT (US)

(72) Inventors: Carson A. Roy Thill, South Berwick, ME (US); Thomas E. Clark, Sanford, ME (US); Danielle Mahoney, Dover, NH (US); Andrew D. Keene, Portland, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/212,333

(22) Filed: Mar. 25, 2021

(65) Prior Publication Data

US 2022/0307382 A1    Sep. 29, 2022

(51) Int. Cl.
*F01D 11/02* (2006.01)
*F01D 11/08* (2006.01)

(52) U.S. Cl.
CPC .............. *F01D 11/02* (2013.01); *F01D 11/08* (2013.01); *F05D 2220/32* (2013.01); *F05D 2240/55* (2013.01); *F05D 2300/20* (2013.01); *F05D 2300/6033* (2013.01)

(58) Field of Classification Search
CPC .......... F01D 11/02; F01D 11/08; F01D 11/12; F01D 11/122; F01D 11/14; F01D 25/24; F05D 2240/55; F05D 2300/20; F05D 2300/6033; F05D 2220/32
See application file for complete search history.

(56) References Cited

U.S. PATENT DOCUMENTS

| | | | | |
|---|---|---|---|---|
| 5,071,313 | A | * | 12/1991 | Nichols ................. F01D 25/246 415/134 |
| 6,340,285 | B1 | * | 1/2002 | Gonyou ................. F01D 25/246 415/176 |
| 10,100,654 | B2 | | 10/2018 | Vetters et al. |
| 10,378,387 | B2 | | 8/2019 | Baldiga et al. |

(Continued)

FOREIGN PATENT DOCUMENTS

EP         3767075  A1    1/2021

OTHER PUBLICATIONS

Ceramics Play a Part in Massive GE Aviation Investment. Mar. 21, 2017. https://www.ceramicsexpousa.com/resources/news/2017/03/21/ceramics-play-a-part-in-massive-ge-aviation-investment/.

(Continued)

*Primary Examiner* — Eldon T Brockman
*Assistant Examiner* — Elton K Wong
(74) *Attorney, Agent, or Firm* — Carlson, Gaskey & Olds, P.C.

(57) ABSTRACT

A component for a gas turbine engine includes a component body formed of ceramic matrix composite lamina and has at least one hook. The at least one hook has an attachment region radially inward of the at least one hook. The attachment region is radially thinner from a hook end of the at least one hook to a remote end, and then becomes radially thicker. A slot is formed through a radial thickness of the at least one hook from the hook end in a remote direction, such that there are two sections of the attachment region. A gas turbine engine is also disclosed.

14 Claims, 3 Drawing Sheets

(56) References Cited

U.S. PATENT DOCUMENTS

| | | | |
|---|---|---|---|
| 2006/0078429 A1* | 4/2006 | Darkins | F01D 9/04 |
| | | | 415/209.2 |
| 2016/0169025 A1* | 6/2016 | Lamusga | F01D 11/08 |
| | | | 415/173.1 |
| 2016/0333785 A1* | 11/2016 | Sener | F02C 3/04 |
| 2020/0040756 A1* | 2/2020 | Clark | F01D 11/22 |
| 2020/0318491 A1 | 10/2020 | Barker et al. | |
| 2020/0362717 A1 | 11/2020 | Clark et al. | |
| 2020/0378264 A1* | 12/2020 | Vetters | F01D 25/24 |
| 2021/0003026 A1 | 1/2021 | Clark et al. | |
| 2021/0025284 A1* | 1/2021 | Sippel | F01D 11/08 |

OTHER PUBLICATIONS

European Search Report for EP Application No. 22164564.1 dated Jun. 14, 2022.

\* cited by examiner

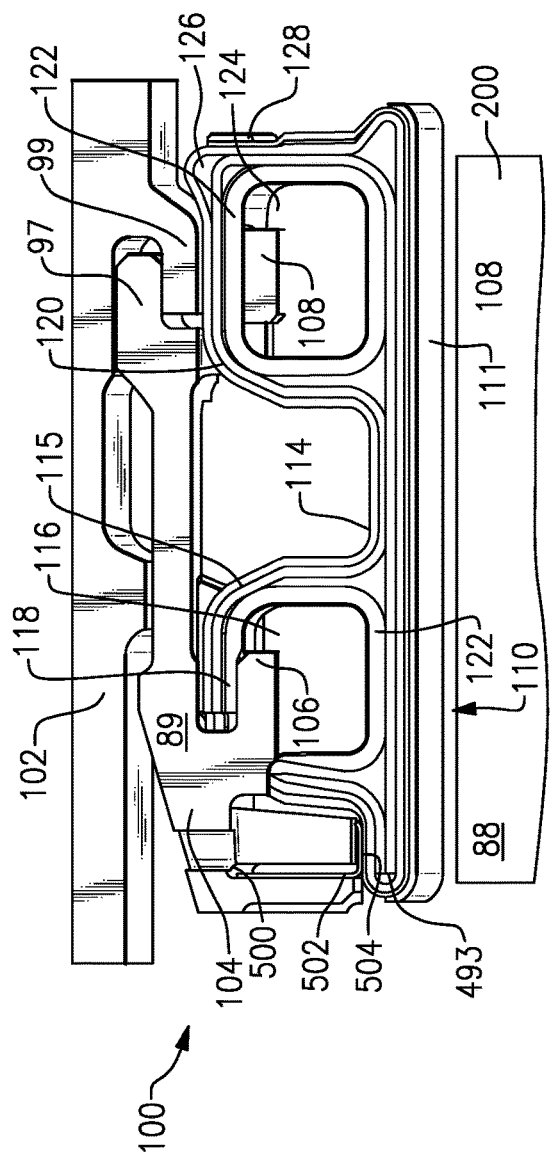
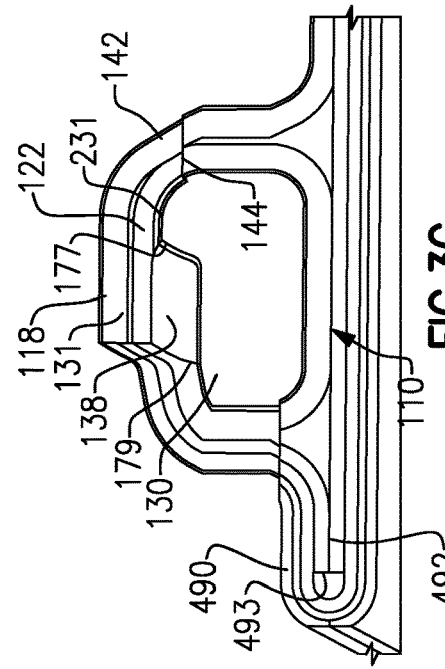
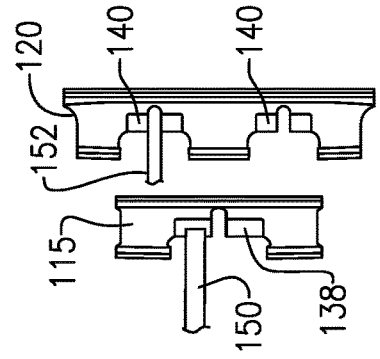
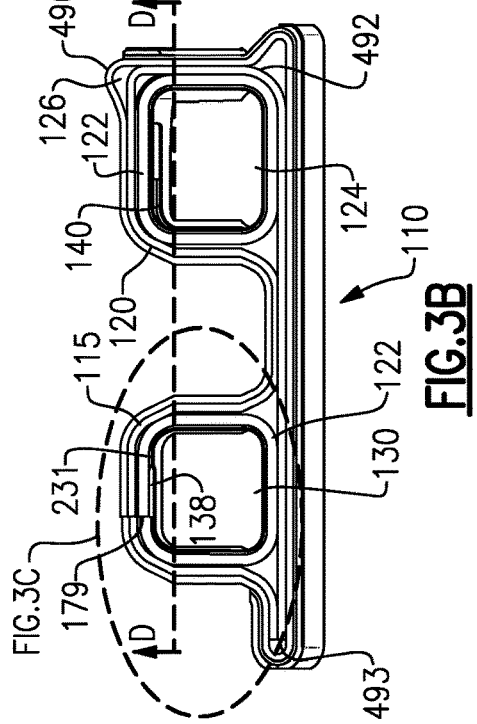
FIG. 2
FIG. 3C
FIG. 4
FIG. 3B

ATTACHMENT REGION FOR CMC COMPONENTS

BACKGROUND OF THE INVENTION

This application relates to treatments of an attachment region in a component formed of ceramic matrix composite ("CMCs") lamina, including hooks for being supported on mount members.

Gas turbine engines are known, and typically include a fan delivering air into a bypass duct as propulsion air and into a core engine where the air is compressed in a compressor section. The compressed air is moved into a combustor where it is mixed with fuel and ignited. Products of this combustion pass downstream over turbine rotors, driving them to rotate. Turbine rotors in turn drive compressor and fan rotors.

As known, the turbine section and combustor section see very high temperatures. It has been proposed to use ceramic matrix composite materials ("CMCs") for various components in the combustor and turbine sections. One such component is a blade outer air seal ("BOAS") which sits radially outside the tip of turbine blades, to minimize leakage around the turbine blades. Typically the BOAS are mounted on mount members having hooks which sit under hooks on the BOAS.

There are other CMC components within a gas turbine engine, such as combustor panels and turbine vanes, as examples, which may include similar mounting hook arrangement.

SUMMARY OF THE INVENTION

In a featured embodiment, a component for a gas turbine engine includes a component body formed of ceramic matrix composite lamina and has at least one hook. The at least one hook has an attachment region radially inward of the at least one hook. The attachment region is radially thinner from a hook end of the at least one hook to a remote end, and then becomes radially thicker. A slot is formed through a radial thickness of the at least one hook from the hook end in a remote direction, such that there are two sections of the attachment region.

In another embodiment according to the previous embodiment, there are at least two of the at least one hooks each formed with the attachment region and the slot.

In another embodiment according to any of the previous embodiments, the at least two hooks are formed in two box portions with an axially intermediate radially thinner portion separating the two box portions.

In another embodiment according to any of the previous embodiments, a forward one of the at least two hooks has the slot extending through an entire axial distance of the hook and to a rear end of a forward one of the two box portions.

In another embodiment according to any of the previous embodiments, a rear one of the two box portions has the slot having a rear end spaced forwardly of a rear end of the rear one of the two box portions.

In another embodiment according to any of the previous embodiments, the rear end of the rear one of the two box portions being in contact with a seal.

In another embodiment according to any of the previous embodiments, a remote end of the slots in each of the at least two hooks extend in a remote direction beyond a remote end of the attachment regions.

In another embodiment according to any of the previous embodiments, there are three of the hooks with one formed in the forward one of the two box portions and two formed in the rear one of the two box portions.

In another embodiment according to any of the previous embodiments, the component is a blade outer air seal.

In another embodiment according to any of the previous embodiments, a remote end of the slots in each of the at least two hooks extend in a remote direction beyond a remote end of the attachment regions.

In another featured embodiment, a gas turbine engine includes at least one turbine blade, and a blade outer air seal mounted radially outwardly of the at least one turbine blade. A component body is formed of ceramic matrix composite lamina and has at least one hook. The at least one hook has an attachment region radially inward of the at least one hook. The attachment region is radially thinner from a hook end of the at least one hook to a remote end, and then becomes radially thicker. A slot is formed through a radial thickness of the at least one hook from the hook end in a remote direction, such that there are two sections of the attachment region.

In another embodiment according to any of the previous embodiments, there are at least two of the at least one hooks each formed with attachment region and the slot.

In another embodiment according to any of the previous embodiments, the at least two hooks are formed in two box portions with an axially intermediate radially thinner portion separating the two box portions.

In another embodiment according to any of the previous embodiments, a forward one of the at least two hooks has the slot extending through an entire axial distance of the hook and to a rear end of a forward one of the two box portions.

In another embodiment according to any of the previous embodiments, a rear one of the two box portions has the slot having a rear end spaced forwardly of a rear end of the rear one of the two box portions.

In another embodiment according to any of the previous embodiments, the rear end of the rear one of the two box portions is in contact with a seal.

In another embodiment according to any of the previous embodiments, a remote end of the slots in each of the at least two hooks extend in a remote direction beyond a remote end of the attachment regions.

In another embodiment according to any of the previous embodiments, there are three of the hooks with one formed in the forward one of the two box portions and two formed in the rear one of the two box portions.

In another embodiment according to any of the previous embodiments, the component is a blade outer air seal.

In another embodiment according to any of the previous embodiments, a remote end of the slots in each of the at least two hooks extend in a remote direction beyond a remote end of the attachment regions.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2 shows a blade outer air seal and mount structure.
FIG. 3B is a cross-sectional view through line B-B of FIG. 3A.

FIG. 3C is an enlarged portion of the section identified by the circle C in FIG. 3B.

FIG. 4 schematically shows a method for forming a mount region on the blade outer air seal.

DETAILED DESCRIPTION

Figure 1:
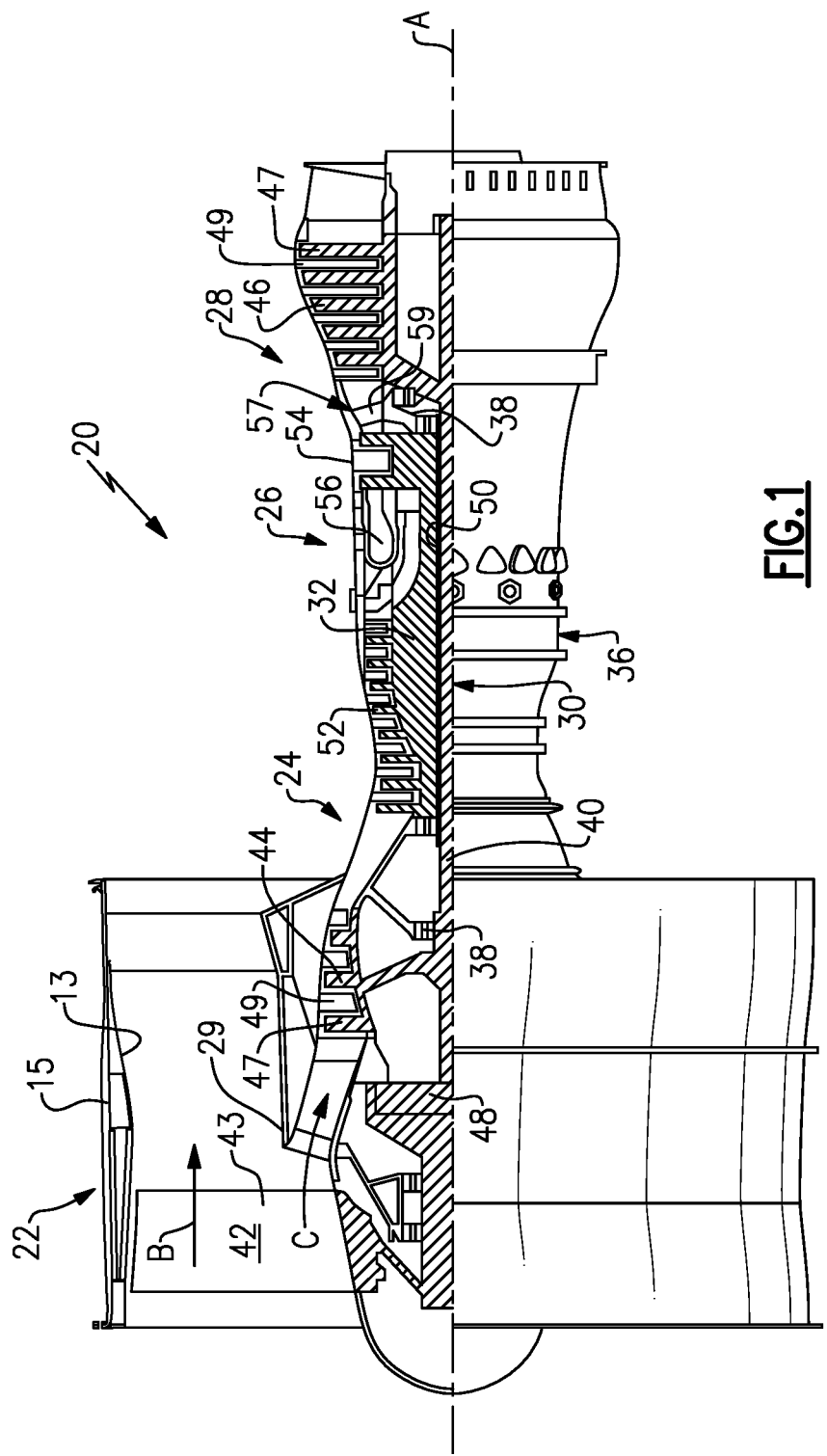
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

FIG. 2 shows a blade outer air seal and mount arrangement 100. A static structure 102 is fixed within the engine. Mount member 104 has a hook 97 support on a hook 99 on static structure 102. Mount member 104 has one hook 106 and two hooks 108 which are received in spaces 116 and 124 under hooks 118 and 113 (FIG. 3A) on a blade outer air seal 110. The blade outer air seal 110 has an inner face 111 facing hot products of combustion in area 88, and a cooler radially outward area 89. A turbine blade 200 is shown schematically having its tip closely spaced from the inner face 111 of the blade outer air seal 110.

A so called "box" portion 115 provides the space 116 and hook 118. Another box portion 120 is spaced from box portion 115 by a central radially thin area 114. Box portion 120 forms the space 124 and hooks 113 receiving the hooks 108. As shown, both box portions 115 and 120 are formed by a plurality of lamina of CMCs. There are continuous lamina 122 forming the spaces 116 and 124. Radially inwardly of the continuous lamina 122 are outer wrap laminas.

A region 126 between plies is formed at an aft or trailing edge of the blade outer air seal 110 and seals against a sealing surface 128. Region 126 and other similar areas in the laminate, have "noodles" which are comprised of CMC material with fibers that may be braided together or straight and travel in an alternate direction to other portions of the laminate. Sealing surface 128 in this embodiment includes a machinable coating to control tolerances and surface roughness to maximize sealing effectivity and increase precision of constraint.

As also can be seen, an L-shaped seal 502 fits into a notch 500 in mount member 104. The seal has an axially extending face that sits against a surface 504 on blade outer air seal 110.

Figure 3A:
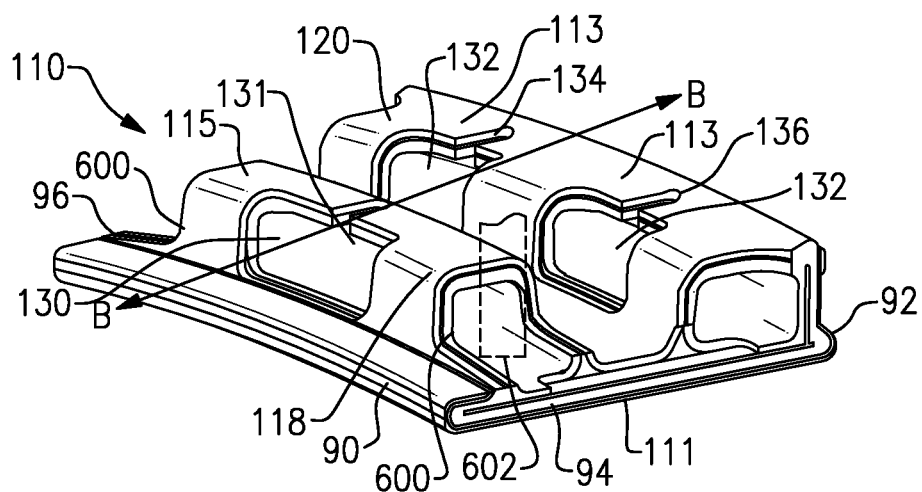
FIG. 3A shows details of a blade outer air seal.

FIG. 3A shows details of the blade outer air seal 110. As shown, there is a first circumferential end 94 spaced from a second circumferential end 96. There is a leading edge 90 and a trailing edge 92. As can be seen, box portion 115 is spaced toward the leading edge 90 and box portion 120 is spaced towards the trailing edge 92. Inner face 111 of the blade outer air seal 110 is curved about a central axis of the engine that will receive the blade outer air seal.

As shown, the box portion 115 has a first opening 130 to receive the hook 106 from the mount member 104. Box portion 120 has two openings 132 to receive two hooks 108 from mount member 104.

There are cut out regions 600 to provide a surface to prevent circumferential movement of the blade outer air seal 110. As shown schematically, a finger 602 from the support 97 fits into the cutout 600 at each circumferential side to prevent rotation.

As can be seen, starting at the opening 130, the BOAS hook 118 has a slot 131 extending in a rearward direction. Similarly, starting at the openings 132, the BOAS hooks 113 have slots 134. Slots 134 extend to a rearward most end 136.

As shown in FIG. 3B, the BOAS hook 118 is an attachment region where an attachment surface 138 is created by machining the laminate between a forward end 179 and a rearward end 177 (FIG. 3C). Rearward of the rearward end 177 there is radially thicker material 231. The undercut 138 is machined away to create a tightly controlled surface to interface with mount member 104 hook 106. The undercut 138 reduces tolerances (if not included, as-densified laminate surface variation would otherwise have greater impact) in order to achieve more precise positioning of BOAS relative to the blade 200.

As can be appreciated, there is an outer wrap layer 490 which is continuous in this view, an intermediate wrap layer 492 which has an end 493 at a forward end, and which surrounds continuous inner portions 122. While each of the portions 490/492/122 are shown as a single layer, it should be understood that each could include a plurality of lamina.

As shown in FIG. 3C, slot 131 extends back through a rear end 142 of the box portion 115. A ledge 144 is shown where slot 131 terminates.

Figure 3D:
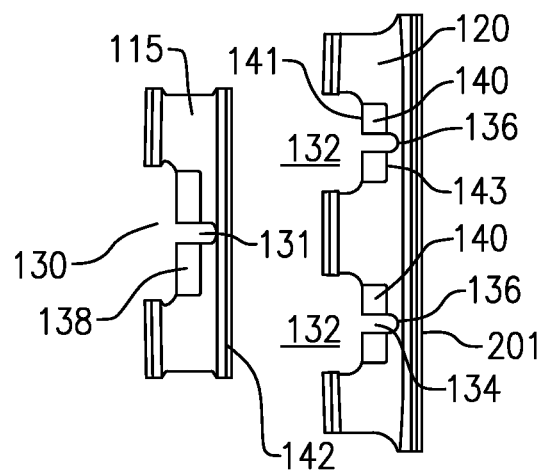
FIG. 3D is a cross-sectional view along the line D-D of FIG. 3B.

As shown in FIG. 3D, the slot 131 effectively bisects the attachment region 138, and extends to the end 142 of the box portion. Similarly, the slots 134 bisect the machined attachment surfaces 140 associated with each opening 132. Slots 134 can be seen to extend to a rearward most end 136 that is beyond a rearward most end 143 of the machined attachment surface 140. The machined attachment surface 140 can be seen to extend from a forward end 141 of the machined region back to a rear end 143. However, it is also clear in this embodiment that the slots 134 do not extend to the rear end 201 of the box 120. There is potential for other embodiments where slot 130 could terminate prior to region 142. Similarly, there is potential for other embodiments where slot 134 extends into region 201.

Applicant has found that machining away the attachment regions 138 and 140 provides a more uniform and predictable surface for the hooks 106 and 108. That is, each of the hooks 106 and 108 rests on an attachment region 138 or 140, and spans a slot bisecting the attachment region.

However, as mentioned above there is also a substantial thermal gradient between the radially inner portion of BOAS 110 and the radially outer portions. As such, there is thermal strain that may be particularly challenging at the machined attachment regions 138 and 140. The slots 131/134 move that strain rearwardly and circumferentially away from the attachment regions.

It should be understood that while the hooks on the mount member 104 face rearwardly and the hooks on the BOAS 110 face forwardly, the reverse could be true where this invention would maintain benefit.

In addition, while the disclosure has been made specifically with regard to a BOAS, the teaching could extend to other hook supported gas turbine engine components formed of CMC lamina such as combustor liners, turbine vanes, etc.

The voids 116 and 124 can be formed by a die portion. The CMC lamina, prior to densification, are placed in a tool or die. The lamina may be silicon carbide fibers with specialized coatings, formed into a braided or woven fabric in each layer. The die would hold the non-densified lamina in the final shape while the lamina goes through the densification process. The densification process may be completed by injecting a gaseous infiltrant (chemical vapor infiltration) into the tooling, and reacting to form a solid composite component. In other examples, the composite BOAS could be created using other material combinations, construction approaches or processing techniques where the invention is still applicable. After densification the lamina obtains structural stability. The areas 116 and 124 are regions where the die was positioned within the lamina to form these areas.

FIG. 4 schematically shows a method of forming the blade outer air seal 110. As shown, machined attachment surfaces 138 and 140 are to be machined by a tool 150. Tool 150 may be an ultrasonic diamond abrasive grit machine. Alternatively, a grinding tool provided with a particular abrasive such as diamond abrasive grit, or other appropriate tooling could be used.

A tool 152 is shown machining one of the slots 134, after the machining of the surface 140. Tools 150 and 152 may be the same tool.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A component for a gas turbine engine comprising:
a component body formed of ceramic matrix composite lamina and having at least one hook, said at least one hook having an attachment region on a radially inward portion of said at least one hook, said attachment region being radially thinner from a hook end of said at least one hook to a remote end, and then becoming radially thicker;
a slot formed through a radial thickness of said at least one hook from said hook end in a remote direction, such that there are two sections of said attachment region;
wherein there are at least two of said at least one hooks each said hook formed with a distinct one of said attachment region and a distinct one of said slot; and
wherein said at least two hooks are formed in two box portions with an axially intermediate radially thinner portion separating said two box portions.

2. The gas turbine engine component as set forth in claim 1, wherein a forward one of said at least two hooks has said slot extending through an entire axial distance of said forward one of said at least two hooks and to a rear end of a forward one of said two box portions.

3. The gas turbine engine component as set forth in claim 2, wherein a rear one of said two box portions has a said slot having a rear end spaced forwardly of a rear end of said rear one of said two box portions.

4. The gas turbine engine component as set forth in claim 3, wherein said rear end of said rear one of said two box portions being in contact with a seal.

5. The gas turbine engine component as set forth in claim 4, wherein a remote end of said slots in each of said at least two hooks extends in a remote direction beyond a remote end of said attachment regions.

6. The gas turbine engine component as set forth in claim 4, wherein there are three of said at least two hooks with one formed in said forward one of said two box portions and two formed in said rear one of said two box portions.

7. The gas turbine engine component as set forth in claim 1, wherein the component is a blade outer air seal.

8. A gas turbine engine comprising:
at least one turbine blade, and a blade outer air seal mounted radially outwardly of said at least one turbine blade;
the blade outer air seal formed of ceramic matrix composite lamina and having at least one seal hook, said at least one seal hook having an attachment region on a radially inward portion of said at least one seal hook, said attachment region being radially thinner from a hook end of said at least one seal hook to a remote end, and then becoming radially thicker;
a slot formed through a radial thickness of said at least one hook from said hook end in a remote direction, such that there are two sections of said attachment region;
wherein there are at least two of said at least one seal hook each formed with a distinct one of said attachment region and a distinct one of said slot; and
wherein said at least two seal hooks are formed in two box portions with an axially intermediate radially thinner portion separating said two box portions.

9. The gas turbine engine as set forth in claim 8, wherein a forward one of said at least two hooks has said slot extending through an entire axial distance of said forward one of said at least two hooks and to a rear end of a forward one of said two box portions.

10. The gas turbine engine as set forth in claim 9, wherein a rear one of said two box portions has said slot having a rear end spaced forwardly of a rear end of said rear one of said two box portions.

11. The gas turbine engine as set forth in claim 10, wherein said rear end of said rear one of said two box portions being in contact with a seal.

12. The gas turbine engine as set forth in claim 11, wherein a remote end of said slots in each of said at least two hooks extends in a remote direction beyond a remote end of said attachment regions.

13. The gas turbine engine as set forth in claim 11, wherein there are three of said hooks with one formed in said forward one of said two box portions and two formed in said rear one of said two box portions.

14. The gas turbine engine as set forth in claim 8, wherein a remote end of said slots in each of said at least two hooks extends in a remote direction beyond a remote end of said attachment regions.

* * * * *